April 21, 1931. R. L. WILLIAMS 1,801,761
AUXILIARY BUMPER AND TIRE RACK BRACE
Filed April 8, 1930
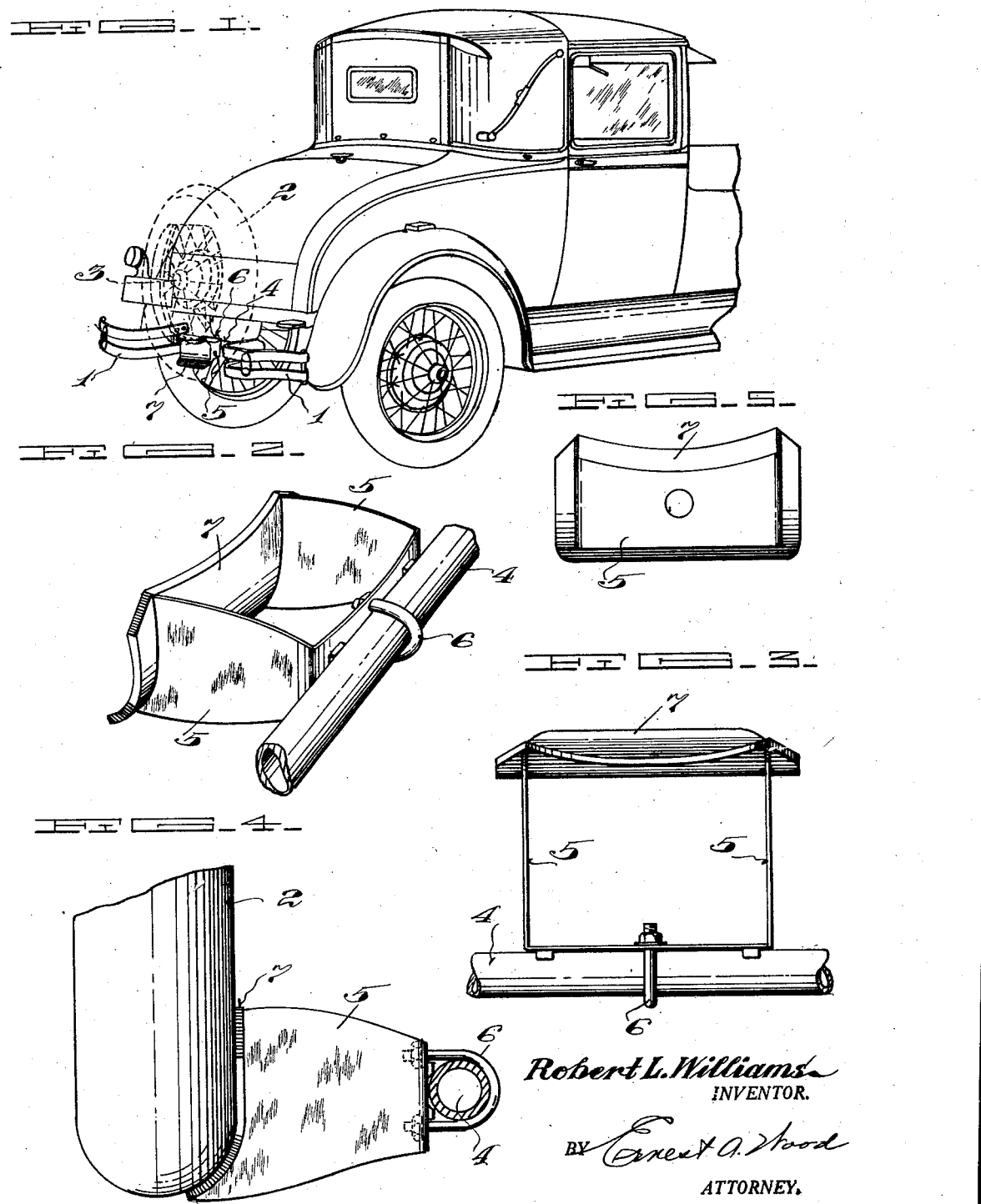
Robert L. Williams
INVENTOR.
BY Ernest A. Wood
ATTORNEY.

Patented Apr. 21, 1931

1,801,761

UNITED STATES PATENT OFFICE

ROBERT L. WILLIAMS, OF DALLAS, TEXAS

AUXILIARY BUMPER AND TIRE-RACK BRACE

Application filed April 8, 1930. Serial No. 442,477.

This invention relates to automobile accessories and it has more particular reference to a tire rack brace and the principal object of the invention resides in the provision of a durable and most effective device of such construction as to enable its application quickly and with little effort to the rear of popular types of motor vehicles, to aid in supporting the spare tire and to prevent accidental breakage of the conventional tire rack, should the tire be struck by the bumper of a car approaching from the rear.

Another object of the invention resides in the provision of a durable and economical device of the character specified, capable of holding the spare tire with such rigidity as to enable the same to resist the impact of a collision by another vehicle and thereby prevent what might otherwise result in serious damage to the vehicle, in other words the device is instrumental in providing what may be regarded as an auxiliary bumper.

With the foregoing objects as paramount, the invention has particular reference to its salient features of construction and purposes which will become manifest as the description proceeds, taken in connection with the accompanying drawings, wherein;

Figure 1 is a fragmentary view of a motor vehicle, showing the invention applied.

Figure 2 is a fragmentary view in perspective of a conventional brace rod showing the manner in which the invention is mounted thereon.

Figure 3 is a plan view of the invention.

Figure 4 is a side elevational view of the invention, fragmentarily showing a tire casing and the relationship of the invention thereto, and Figure 5 is a rear view of the invention showing a single aperture to receive a bolt.

Continuing more in detail with the drawings, 1 designates the conventional rear bumpers, as shown in Figure 1, between which the spare tire 2 is mounted upon a projecting spindle 3 in a vertical plane intermediately above the said bumpers. On a popular make of automobile, there is provided a brace rod 4, also shown in Figure 1, and fragmentarily shown in Figure 2. This brace rod supports the bumpers 1 and reinforces them against a colliding object.

In the absence of any reinforcing means any object colliding with the lower portion of the spare tire 2, would bring about severe strain upon the supporting spindle 3, possibly breaking it off or injuring the same, and since this is constantly occurring, due to the fact that the tire is prominently mounted and subject to injury by collision therewith of a vehicle, it is desirable that the bottom portion of the tire be reinforced to resist the impact of a colliding vehicle or object.

To accomplish the foregoing, the invention comprises a substantially U-shaped member 5, which is affixed by means of a U-shaped bolt 6 to the reinforcing rod 4, which rod is conventional equipment on the vehicle. To the outer end of the member 5 is affixed a plate 7. As apparent in the figures this plate is preferably curved to conform with the tread of the tire 2 in order that the same may rest thereupon with conformity to prevent frictional wear.

It is understood that while the member 5 and plate 7 are shown to be two separate pieces, welded or otherwise suitably affixed together, the invention may consist of only one piece by lengthening the plate 7 and turning its ends rearwardly and attaching them in the manner shown to the rod 4. Obviously, in either case the structure described and shown in the several figures, when mounted as described will resist pressure against the tire casing 2 and prevent injury to the tire mounting and possible injury to the vehicle itself.

Manifestly, the construction shown is capable of considerable modification and such modification as is considered within the scope and meaning of the appended claims is also considered within the spirit and intent of the invention.

What is claimed is:

1. In combination with the bumper brace rod of a vehicle, a tire rack brace including a mounting affixed to the vehicle and protruding outwardly adjacent the bottom of said tire at right angles relative to said rod and having a plate affixed to its outer end, said plate being arranged to conform to the surface of said tire.

2. In combination with the bumper brace rod of a vehicle, a spare tire rack brace for vehicles including a mounting affixed to and extending at right angles from said rod, a plate shaped to conform to the surface of said tire and having connection with said mounting and means to affix said mounting to said vehicle at a point opposite the lowermost portion of said tire when the latter is in position on said rack.

3. In combination with the bumper brace rod of a vehicle, a spare tire rack brace including a plate for bracing the lowermost portion of said spare tire and having a rigid mounting detachably secured to said brace rod at right angles thereto and at a point opposite the lowermost portion of said tire.

4. In combination with the bumper brace rod of a vehicle, a spare tire brace including a plate curved under the tread of said tire in a vertical plane and means for detachably mounting said plate on said vehicle whereby to resist pressure applied against said tire.

In testimony whereof I affix my signature.

ROBERT L. WILLIAMS.